Sept. 27, 1927.

F. N. ROSS 1,643,473

CLUTCH MECHANISM

Filed Oct. 6, 1926

INVENTOR.
Frederick N. Ross.
BY
Stuart C Barnes
ATTORNEY.

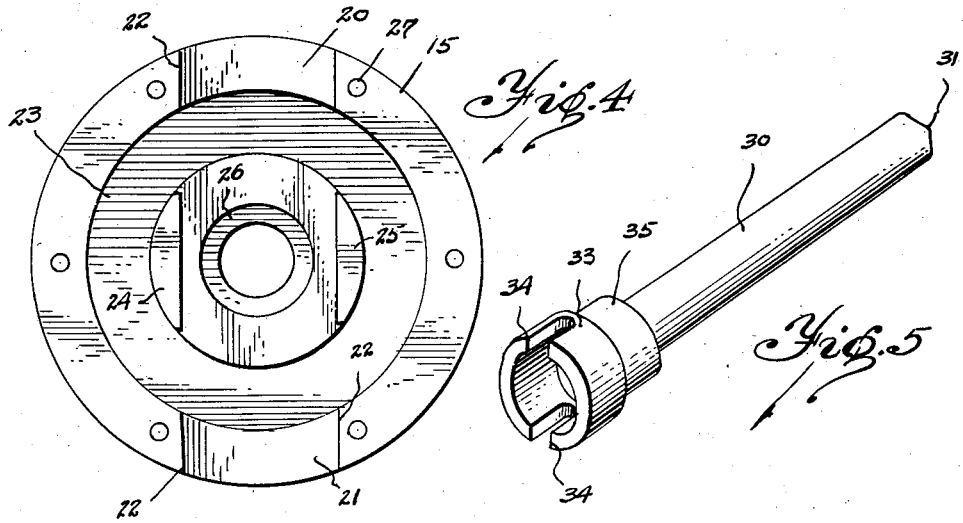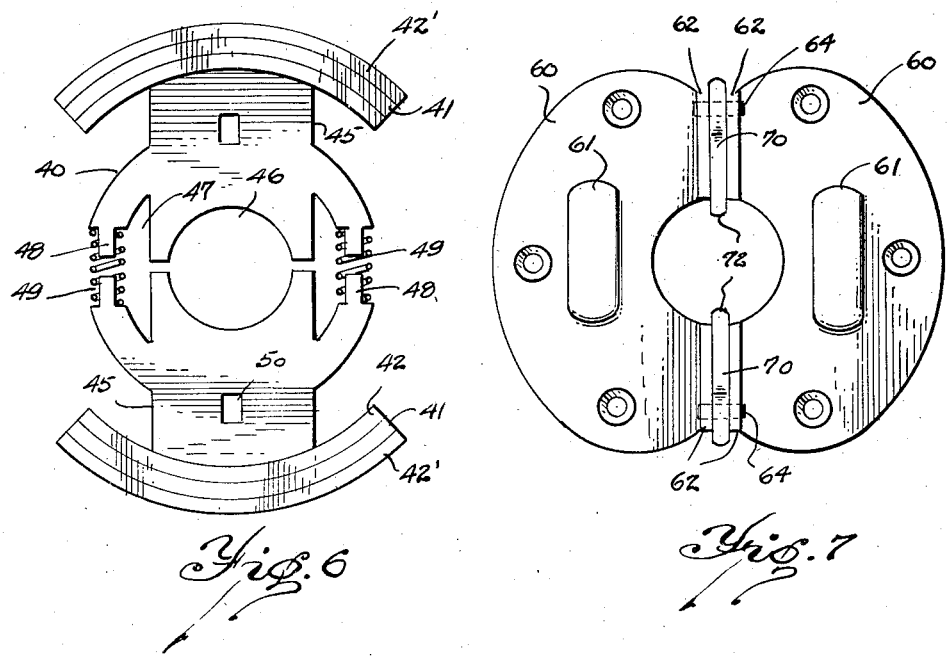

Patented Sept. 27, 1927.

1,643,473

UNITED STATES PATENT OFFICE.

FREDERICK N. ROSS, OF DETROIT, MICHIGAN.

CLUTCH MECHANISM.

Application filed October 6, 1926. Serial No. 139,781.

This invention relates to clutch mechanism and more especially to clutch and brake mechanism which is useful with machines which are often started and stopped in their operation.

More specifically, the invention is concerned with a clutch and brake mechanism especially adapted for the needle industry. In this industry, it has been the practice to supply each machine with an individual power means, such as an electric motor, and provision was necessarily made for frequent starting and stopping of the machine.

It has been proposed to start and stop the motor to effect intermittent operation of the machine, but this has been found to be unsatisfactory because of undue strain on the motor, and it was found that motors of standard construction would not stand up under this sort of use. Also clutching mechanism has been proposed, but so far as I am aware, no such mechanism has been proposed which is capable of giving an action which is accurate enough and delicate enough to meet the requirements.

In accordance with the present invention, a clutch mechanism is provided which permits the continuous running of the motor and which affords a quick and delicate handling of the starting and stopping of the machine. The mechanism as a whole can be made into a compact arrangement so that it can be secured to the motor housing.

The mechanism includes a driving member attached to the motor shaft, and a driven member which is connected to the machine in any desired way, as by means of a belt. This driven member is capable of being actuated so as to either engage the driving member and cause an operation of the machine, or to disengage the driving member and act as a brake so that the machine is quickly caused to stop. A single operating part is provided for actuating this driven member, and the connection between this part and the driven part is such that one movement of the part provides for the release of the clutching action and the application of the brake or vice versa. Due to the fact that the driven member of the clutch also serves as a braking member, the machine which is operated is caused to come to a stop without delay when the clutch is released.

A satisfactory form of the invention is shown in the accompanying drawings, wherein Fig. 1 is a diagrammatic view showing sewing machines mounted upon a bench, each of which is provided with a driving motor, and showing how the clutching mechanism appears when attached to the housing of the motor.

Fig. 4 is a plan view of the face of a part of the driven member.

Fig. 5 is a perspective view of the operating part.

Fig. 6 is a plan view of the movable parts of the driven member which are operable to engage and disengage the driving member and to also act as a brake.

Fig. 7 is a plan view of plates which are secured to the driven member and which pivotally hold links by means of which the clutching and braking action is effected.

Fig. 8 is a perspective view of one of the plates, as shown in Fig. 7, showing one of the links and its pivot pin.

Figure 1:
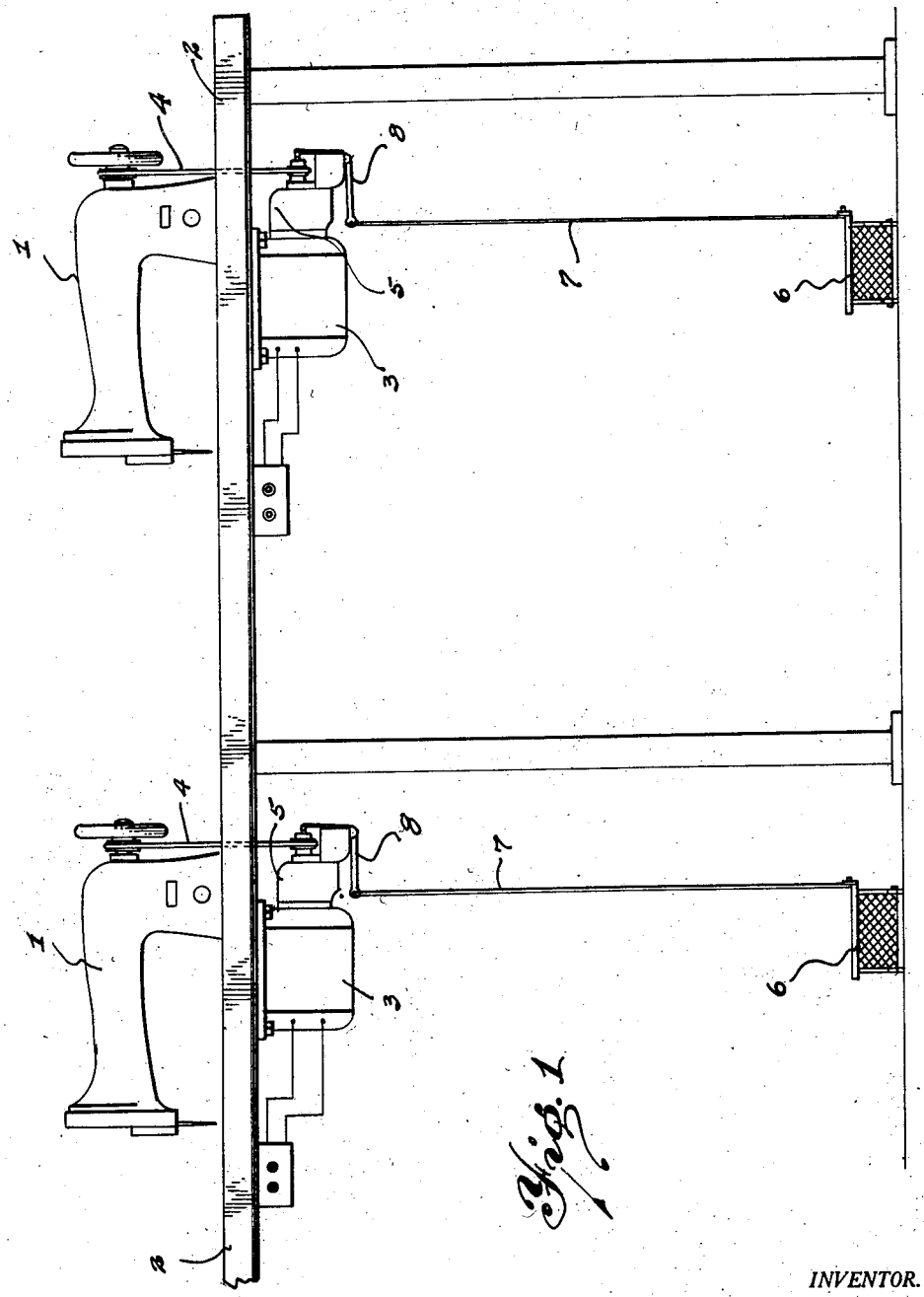

Referring to the drawings, Fig. 1 shows sewing machines 1 mounted upon a table 2. Each sewing machine is provided with a motor 3 for operating the same, and is connected to the motor by means of a belt 4. The clutching mechanism of this invention is within a housing 5 which is preferably secured to the housing of the motor. This clutching mechanism is operable by the operator through the means of a pedal 6 which is connected through the link 7 to an operating member 8. This member 8 is in the form of a bell-crank pivoted at 8' on a bracket 9. This bracket may include web members 9' which lie on opposite sides of the member 8 so as to prevent interference with such member.

Figure 2:
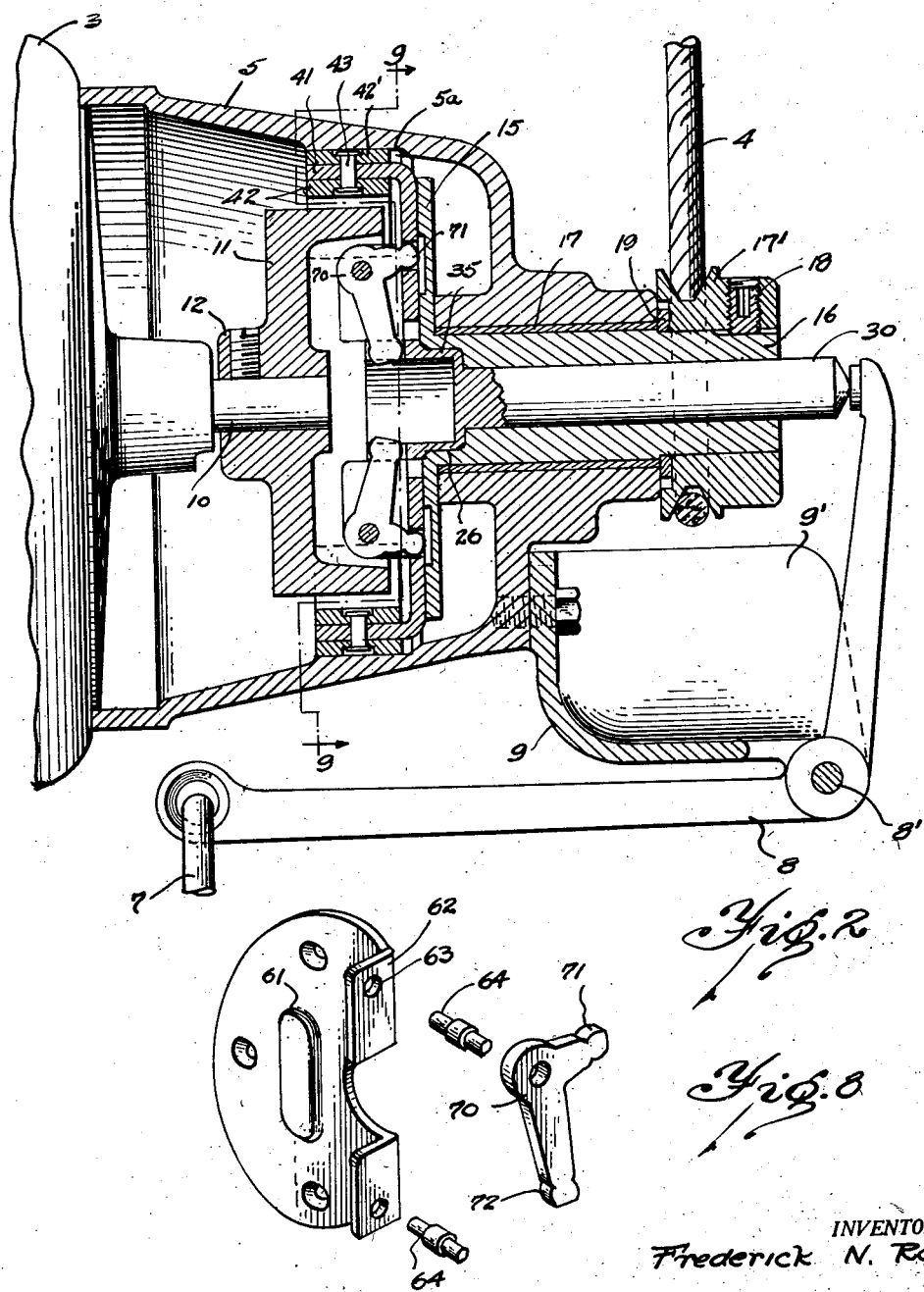
Fig. 2 is a sectional view taken through the clutching mechanism, showing how the mechanism is disposed within a housing which is in turn secured to the motor housing, and showing the clutching mechanism in released position with the brake applied.

Referring to Fig. 2, the shaft of the motor is referenced 10, and upon this shaft is mounted a driving member 11 which may be locked to the shaft by means of a set screw 12. The driven member includes a disk-like plate 15 which has a tubular extension 16 which protrudes out through an opening in the housing 5. This opening through which the portion 16 protrudes, is preferably provided with bushing 17 of suitable material for a bearing. Upon the outer end of the portion 16 is a pulley 17 which may be fixed to the portion 16 by means of a set screw 18. A thrust washer 19 may be interposed between the housing and the pulley.

As shown in Fig. 4, the disk-like member 15 is cut away as at 20 and 21, so as to provide shoulders at 22. The disc is also shaped so as to provide an annular recessed portion 23, and on opposite sides of the center of the disc are abutments 24 and 25. By reference to Fig. 2, it will be seen that the hollow extension 16 is provided, near the point where the extension and the disc join, with an enlarged portion shown at 26.

The clutch operating part is shown in Fig. 5, and consists of a shaft-like part 30 which fits within the hollow extension 16 and having an end 31 adapted for engagement with the member 8, as is shown in Fig. 2. One end of the member 30 is enlarged and hollow, as at 33, and is provided with oppositely disposed slots 34. The part is also provided with shoulder 35 which seats within the enlarged part 26 of the tubular extension 16, as shown in Fig. 2.

The driven member of the clutch and brake is provided with movable members 40, as shown in Fig. 6. Each movable member includes a laterally extending part 41 (Fig. 2), which has, on opposite sides thereof, material 42 and 42' suitable for braking and clutching purposes. This material may be of leather or any other suitable fabric. The layers of material may be secured to the laterally extending portion by means of rivets 43.

Figure 9:
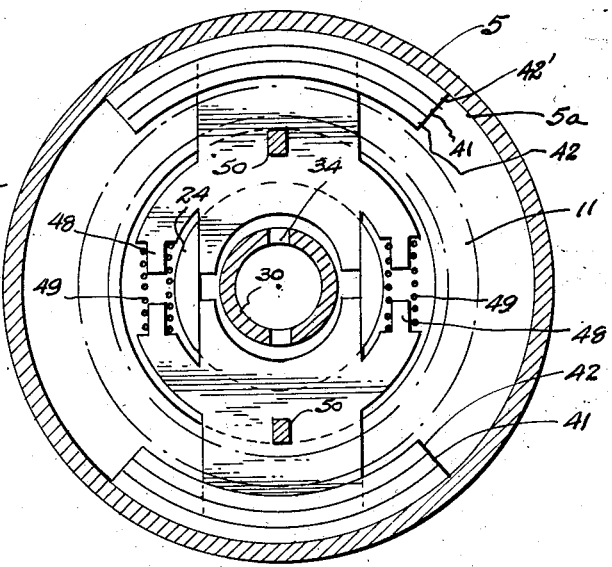
Fig. 9 is a sectional view taken on the line 9—9 of Fig. 2, showing the parts in braking position.
Figure 10:
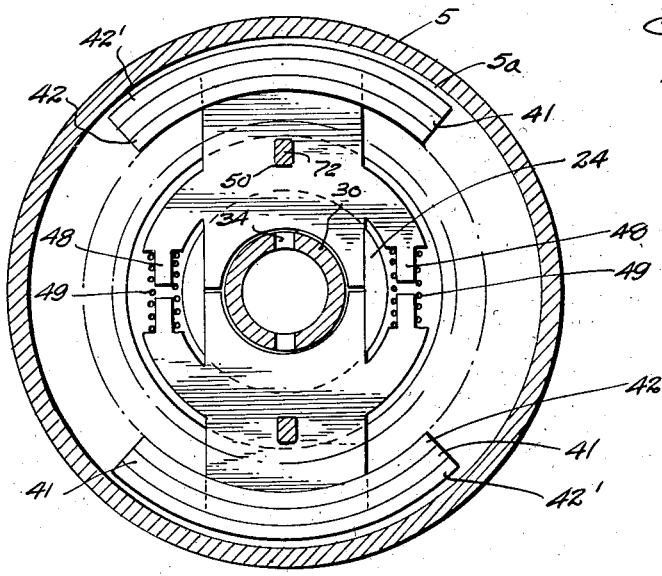
Fig. 10 is a sectional view similar to Fig. 9, showing the parts in clutching position.

Each movable member includes a shank-like portion 45, and this shank-like portion is adapted to slidably fit in between the shoulders 22 on the disk 15. The two members are fitted to the disk and are associated with each other in a manner shown in Fig. 6. They are shaped so as to provide a central opening 46 for accommodating the member 30, and are shaped as at 47 so as to slidably engage the abutments 24 and 25 of the disk and to be guided thereby. Each movable member has projections 48 oppositely disposed with respect to the projections on the other disc, and coil springs 49 are held in place by these projections. Each movable member has an opening 50 for the purpose of receiving an operating link, as will be presently described. In Figs. 9 and 10, the two movable members are shown as they appear when mounted upon the disk 15.

Figure 3:
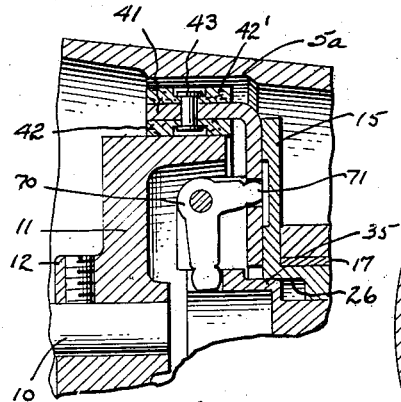
Fig. 3 is a sectional view similar to Fig. 2, but showing the position of the parts when the driving and the driven member of the clutch are engaged.

Mounted upon the disk 15 over the movable members are plate members 60 (Figs. 7 and 8). These members are provided with openings for the purpose of receiving machine screws which are threaded into openings 27 in the disk. These plates are shaped so as to provide a central opening for accommodating the operating part 30. The disks are also shaped so as to accommodate the coil springs 49. If it is desirable to make the disks of a casting, a recess 61 may be machined out of each casting, but if the plates are made from a stamping, depressions 61 may be stamped into the plates. The springs 49 fit in between the wall of the annular depression 23 of the disk 15, and the depressed portions 61 of the plates. Each plate is provided with an upturned flange-like member 62 (Fig. 8). The flanges are provided with the holes 63 for receiving a pin 64 upon which is mounted a link 70. The pins 64 are preferably provided with an enlarged central portion so that the plates 60 are accurately spaced, and binding of the links is prevented, so that free pivotal movement is assured. The links 70 are in the nature of bell-cranks and are provided with somewhat rounded ends 71 and 72. When the parts are in assembled position, as shown in Figs. 2 and 3, the rounded ends 72 of the links engage in the slotted portion 34 of the operating part 30, and the ends 71 engage in the apertures 50 of the movable members 40.

It will be observed that the driven member consists of the parts shown in Figs. 4, 6 and 7, and that when the operating part 30 is inserted within the tubular extension of the disk 15, the movable parts 40 disposed between the shoulders 22 so as to slide therein, and the plates 20 fastened securely by means of screws to the disk 15, that the several parts are held securely together as a single unit. The members 40 lie in the depressed portions of the disc 15 and the plates 60 rest upon the relatively raised portions around the edge thereof. The parts are nicely fitted so that the members 40 are readily slidable.

The coil springs 49 serve to normally separate the movable parts 40 so that they take the position shown in Figs. 2 and 9. The movable members are retracted by inward movement of the part 30. This is accomplished by the operator depressing the pedal 6 which operates through the link 7 and bell-crank 8. Upon movement inwardly of the part 30, the links 70 are caused to turn on their pivots by reason of the fact that one end of each link is engaged in a recess 34. As the links are pivoted, the ends 71 thereof cause a retraction of each movable part, because each end is engaged in a recess 50. During this action the parts move from the position shown in Fig. 2 to that shown in Fig. 3. As shown in Figs. 2 and 9, the housing 5 is provided with a smooth, annular surface 5ª against which the fabric 42' is adapted to contact in order to effect a braking operation.

The connection between the shaft 30 and the movable members 40 by means of the links, is such that the direction of movement of the operating shaft 30 is changed. By reason of the fact that the springs 49 act to hold parts 40 normally separated, the ends 72 of the links always embrace the bottom of the slots 34. For this reason slots may be used instead of holes, such as are used in the members 40, as the links will not slip out of the slots, and moreover, such construction makes for ease in assembling the device.

In the operation of the device, it will be understood that the motor together with the driving member 11 turn continuously. When it is desired to connect the motor with a machine, the operator depresses the pedal and causes an inward movement of the part 30, which in turn swings the links 70 on their pivots, thus retracting the movable parts 40. The fabric 42 attached to each part engages the rim of the driving member 11, and the driven member is thus caused to rotate therewith. There is no driving strain upon links since the members 40 are locked to the disc 15 by reason of the fact that the parts 40 fit between the shoulders 22 of the disc. The operating shaft 30 rotates with the driven member, and its outer end is such as to make for a limited amount of friction with the end of the bell-crank. The end of the ball-crank may be machined as shown. The machine will continue to operate so long as the operator keeps the pedal in depressed position. When, however, the operator desires to stop the machine, the pedal is merely released and the coil springs 49 act to separate the members 40. At the same time, the links pivot and cause the member 30 to move outwardly. In this declutching action the outermost fabric 42' engages the annular surface 5ª under the action of the coil springs, thus serving as a brake for stopping the machine.

It will thus be observed that the clutching and braking action of the mechanism of this invention is accomplished through the same parts of the driven member, and that a change of the position of the parts from braking position to clutching position, or vice versa, is accomplished by one motion and by one operative act. By reason of the fact that the braking is effected by the driven member, the machine is stopped almost immediately upon release of the clutch.

In the needle industry the sewing machine must be stopped at precisely the right time, and there are many times when a sewing machine must necessarily be operated for making only a few stitches. As a consequence, any clutch and brake mechanism which is used must have a very delicate and positive action. This is afforded by the mechanism of the present invention, and by proper movement of the pedal by the operator the machine can be caused to operate with great nicety.

For the purpose of convenience I have shown the clutch mechanism as being operated by a foot pedal and a bell-crank arrangement. However, it will be understood that the mechanism may be operated by any other desired arrangement, as for instance, a lever against which the knee of the operator is pressed. Moreover, while the invention is particularly useful in the operation of sewing machines in the needle industry, yet the mechanism is capable of use in any industry where a machine is frequently started and stopped in its operation, and it will therefore be understood that the invention is not limited to the operation of sewing machines.

What I claim is:

1. A clutch and brake mechanism comprising in combination a driving member, means affording a relatively stationary surface spaced from the driving member, a driven member having a movable member playing between the driving member and the said surface, and means operable to actuate such movable member to engage the driving member or the surface to effect a clutching action and a braking action respectively.

2. A clutch and brake mechanism comprising in combination a driving member, means affording a relatively stationary surface spaced from the driving member, a driven member having movable parts playing between the driving member and the surface, and an operable part disposed in the axial center of the driven member, said operating part being connected to the movable parts of the driven member.

3. A clutch and brake mechanism comprising in combination a driving member having a rim, means affording a relatively stationary surface spaced from the rim of the driving member, a driven member having a movable part playing between the rim of the driving member and the surface, and means operable to cause such movable part to engage either the rim of the driving member or the surface to effect a clutching action and a braking action respectively.

4. A clutch and brake mechanism comprising in combination a driving member having a rim, means affording a relatively stationary surface spaced from the rim of the driving member, a driven member having a part disposed in the space and capable of radial movement so as to engage the rim or surface, and operating means connected to the said part to effect such radial movement, said operating means being such that a single movement thereof effects the releasing of the clutch and application of the brake, or vice versa.

5. A clutch and brake mechanism comprising in combination a driving member having a rim, means affording a relatively stationary surface spaced upon said rim, a driven member having radially movable parts disposed in such space and adapted to engage the rim and the surface, an operating part disposed in the axial center of the driving and driven members, this operating part being capable of axial movement, and a connection between this operating part and the movable parts of the driven member.

6. A clutch and brake mechanism comprising in combination a driving member having a rim surface, means affording a relatively stationary surface spaced from the rim of the driving member, a driven member having a movable part playing between the rim and the surface and adapted to engage the rim and surface to effect a clutching and braking action respectively, means for effecting movement of said movable part whereby a single movement thereof causes the movable part to disengage one surface and engage the other.

7. A clutch and brake mechanism comprising in combination a driving member having a rim, a housing having an annular surface spaced from said rim, a driving member having parts disposed between the rim and the surface of the housing and capable of radial movement, means connected with said parts for effecting radial movement thereof whereby the parts are caused to engage the rim of the driving member or the said surface in the housing.

8. A clutch and brake mechanism comprising in combination a driving member having a rim, a housing having an annular surface spaced from said rim, a driven member including a hollow shaft and having movable members disposed between the rim and the surface of the housing, an axially movable operating part disposed in the hollow shaft, and bell-cranks pivoted on the driven members connected to said operating part and the movable members, whereby axial movement of the operating part effects radial movement of the movable members.

9. A clutch and brake mechanism comprising in combination a driving member having a rim, a housing having an annular surface spaced from said rim, a driven member including a hollow shaft and having movable members disposed between the rim and the surface of the housing, an axially movable operating part disposed in the hollow shaft, and bell-cranks pivoted on the driven members and connected to said operating part and the movable members, whereby axial movement of the operating part effects radial movement of the movable members having their opposite ends connected to the movable members and the operating part, whereby axial movement of the operating part effects radial movement of said movable members.

10. A clutch and brake mechanism comprising in combination a driving member having a rim, a housing having an annular surface spaced from said rim, a driven member including a hollow shaft and having a movable member disposed between the rim and the surface of the housing, an axially movable operating part disposed in the hollow shaft, a bell-crank pivoted on the driven member and connected to said operating part and the movable member whereby axial movement of the operating part effects radial movement of the movable member, and fabric material secured to said movable member for alternately engaging the rim of the driving member and the surface in the housing.

11. A clutch and brake mechanism comprising in combination a driving member, means affording a relatively stationary surface spaced from the driving member, a driven member including a part playing between the driving member and the surface, a bell-crank pivoted in the driven member, having one end thereof in engagement with said part, an axially disposed and axially movable operating shaft having a connection with the opposite end of the bell-crank whereby axial movement thereof effects radial movement of the movable part of the driven member.

12. A clutch and brake mechanism comprising in combination a driving member, a driven member, a housing having a surface spaced from the driving member, the driven member having a pair of oppositely disposed radially movable members adapted to engage the driving member and the surface in the housing to act as a clutch and brake respectively, means for urging the two oppositely disposed members normally outwardly to engage the surface, and operating means for retracting the members to engage the driving member.

13. A clutch and brake mechanism comprising in combination a driving member, a driven member, a housing having a surface spaced from the driving member, the driven member having a pair of oppositely disposed radially movable members adapted to engage the driving member and the surface in the housing to act as a clutch and brake respectively, means for urging the two oppositely disposed members normally outwardly to engage the surface, and operating means for retracting the members to engage the driving member, said means consisting of an axially movable shaft disposed in the axial center of the driven member.

14. A clutch and brake mechanism comprising in combination a driving member, a driven member, a housing having a surface spaced from the driving member, the driven member having a pair of oppositely disposed radially movable members adapted to engage either the driving member and the surface in the housing to act as a clutch and brake respectively, means for urging the two oppositely disposed members normally outwardly to engage the surface, operating means for retracting the members to engage the driving member, said means consisting of an axially movable shaft disposed in the axial center of the driven member, and a lever connection between the shaft and the oppositely disposed members.

15. A clutch mechanism comprising in combination, a pair of controlling members having spaced apart surfaces, a driven member having a movable member playing between the said two spaced apart surfaces, and means operable to actuate such movable member to engage the said surface on the one member or the other to effect a clutching action with the said surface so engaged.

16. A clutch mechanism comprising in combination, a driving member having a frictional engaging surface, a controlling device having a frictional engaging surface spaced from the said surface of the driving member, a driven member having a movable member playing between the said surfaces of the driving member and the control member, and means operable to actuate such movable member to engage the surface on the driving member or the control member to effect the clutching action with the said member so engaged.

17. A clutch mechanism comprising in combination, a member provided with a frictional engaging surface, a second member provided with a frictional engaging surface spaced from the first mentioned surface, a third member having movable part playing between the said surfaces and operable to engage either of said surfaces whereby a clutching action is obtained between either of the first two mentioned members and the third mentioned member.

In testimony whereof I affix my signature.

FREDERICK N. ROSS.